United States Patent
Raghupathy et al.

(10) Patent No.: US 9,967,845 B2
(45) Date of Patent: May 8, 2018

(54) SYSTEMS AND METHODS FOR SELECTIVELY RECEIVING AND PROCESSING RF SIGNALS AT AN RF BEACON

(71) Applicant: NextNav, LLC, Sunnyvale, CA (US)

(72) Inventors: Arun Raghupathy, Bangalore (IN); Subramanian S. Meiyappan, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 90 days.

(21) Appl. No.: 14/954,462

(22) Filed: Nov. 30, 2015

(65) Prior Publication Data

US 2016/0165562 A1 Jun. 9, 2016

Related U.S. Application Data (60) Provisional application No. 62/089,138, filed on Dec. 8, 2014.

(51) Int. Cl.
| | | |
|---|---|---|
| *H04W 56/00* | (2009.01) | |
| *H04W 72/06* | (2009.01) | |
| *H04W 72/04* | (2009.01) | |

(52) U.S. Cl.
CPC ..... *H04W 56/0015* (2013.01); *H04W 56/001* (2013.01); *H04W 56/002* (2013.01); *H04W 72/046* (2013.01)

(58) Field of Classification Search
CPC ........... H04W 56/002; H04W 56/0065; H04W 56/001; H04W 56/0015; H04W 56/008
See application file for complete search history.

(56) References Cited

U.S. PATENT DOCUMENTS

| | | | |
|---|---|---|---|
| 2011/0285589 A1* | 11/2011 | Bull ..................... | G01S 5/0242 342/387 |
| 2012/0182180 A1 | 7/2012 | Wolf et al. | |
| 2012/0249233 A1* | 10/2012 | Farahani Samani .. | H03F 1/3247 330/75 |
| 2012/0300795 A1* | 11/2012 | Joergensen ........... | H04J 3/0667 370/503 |

(Continued)

OTHER PUBLICATIONS

Information about Related Patents and Patent Applications.

(Continued)

*Primary Examiner* — Michael Thier
*Assistant Examiner* — Brian P Cox (57) ABSTRACT

Synchronizing the local time of beacons using two way time transfer methods and hardware enabling such methods. Certain systems incorporate receive hardware into beacon circuitry used for transmitting signals so that the beacon can transmit RF signals during transmission periods, and can also receive RF signals from other beacons during non-transmission periods. Receive hardware may be incorporated into beacon circuitry such that the beacon receives an incoming signal and passes that incoming signal to a digital pre-distortion linearization module, which can process that received signal. Methods for controlling whether a beacon transmits RF signals or receives RF signals are also discussed, as are methods for using RF signals received from other beacons for synchronization.

18 Claims, 9 Drawing Sheets

(56) References Cited

U.S. PATENT DOCUMENTS

| | | | | |
|---|---|---|---|---|
| 2013/0148639 A1* | 6/2013 | Gao | ...................... | H04J 3/0641 |
| | | | | 370/336 |
| 2014/0211781 A1* | 7/2014 | Kim | .................. | H04W 56/0025 |
| | | | | 370/350 |
| 2016/0057684 A1* | 2/2016 | Larsson | ................ | H04W 36/26 |
| | | | | 370/331 |

OTHER PUBLICATIONS

U.S. Appl. No. 15/496,448, filed Apr. 25, 2017, Meiyappan Raghupathy Pelgrum.
Form PCT/ISA/220, PCT/US2015/062997, "Notification of Transmittal of the International Search Report and the Written Opinion of the International Searching Authority, or the Declaration", 1 page(s); Form PCT/ISA/210, PCT/US2015/062997, "International Search Report", 5 page(s); Form PCT/ISA/237, PCT/US2015/062997, "Written Opinion of the International Searching Authority", 7 page(s), dated May 17, 2016.
Form PCT/ISA/206, PCT/US2015/062997, "Invitation to Pay Additional Fees and, Where Applicable, Protest Fee", 5 page(s), dated Mar. 2, 2016.
Chang et al., "A New Energy-Efficient Time Synchronization Protocol in Wireless Sensor Networks", 2014 IEEE International Conference on Computer & Information Technology, IEEE, Sep. 11, 2014, pp. 684-688, XP032702950.

* cited by examiner

SYSTEMS AND METHODS FOR SELECTIVELY RECEIVING AND PROCESSING RF SIGNALS AT AN RF BEACON

FIELD

Various embodiments relate to wireless communications, and more particularly, to synchronizing the local time of beacons using two-way time transfer procedures.

BACKGROUND

Determining the exact location of a receiver (e.g., a mobile phone) in an environment can be quite challenging, especially when the receiver is located in an urban environment, or is located within a building Imprecise estimates of the receiver's position may have "life or death" consequences for the user. For example, an imprecise position estimate for a receiver, such as a mobile phone operated by a user calling 911, can delay emergency personnel response times when responding to the call. In less dire situations, imprecise estimates of the user's position can negatively impact efforts to provide navigation to a desired destination.

Positioning systems used to estimate the position of the receiver, like the Global Positioning System (GPS), have been in use for many years. Unfortunately, poor signal conditions found in urban and indoor environments may degrade the performance of these conventional positioning systems. To improve positioning accuracy in urban and indoor environments, GPS may be replaced or augmented by positioning systems that use terrestrial beacons, such as those in cellular phone networks, those described in co-assigned U.S. Pat. No. 8,130,141 and co-assigned U.S. patent application Ser. No. 13/296,067, or others.

Such systems may transmit positioning/timing signals from multiple beacons of known locations to the receiver in order to generate pseudoranges that may then be used when generating a position estimate of the receiver. As is known in the art, a pseudorange may be derived using an estimated time-of-flight of the transmitted positioning/timing signal transmitted by a beacon to the receiver—i.e., the time during which the signal was in transit between its time of departure from the beacon and the time of arrival at the receiver. Since the estimated position of the receiver may be generated using pseudoranges associated with multiple beacons, it follows that the accuracy of the estimated position of the receiver will be affected by the degree to which the clocks of the multiple beacons are synchronized between themselves.

Unfortunately, synchronization of beacons in terrestrial positioning networks can be difficult or expensive to achieve. For example, a network may rely on providing a time synchronization RF signal to each beacon from a centralized source. However, some beacons may be unable to receive that synchronization signal from the centralized source, or the cost to provide that synchronization signal from the centralized source to particular beacons is too high. Thus, network-wide and cost-effective approaches for synchronizing a beacon's clock are needed.

SUMMARY

Certain embodiments of this disclosure relate generally to systems, methods and machine-readable media for synchronizing the local time of beacons.

One method for synchronizing the local time of beacons comprises: transmitting a first timing signal from a first beacon; receiving the first timing signal at a second beacon; using a time measured by a local clock of the first beacon to identify a first transmission time when the first beacon transmitted the first timing signal; using a time measured by a local clock of the second beacon to identify a first reception time when the second beacon received the first timing signal; transmitting a second timing signal from the second beacon; receiving the second timing signal at the first beacon; using another time measured by the local clock of the second beacon to identify a second transmission time when the second beacon transmitted the second timing signal; using another time measured by the local clock of the first beacon to identify a second reception time when the first beacon received the second timing signal; and synchronizing the local clock of the first beacon with the local clock of the second beacon based on the first transmission time, the first reception time, the second transmission time, and the second reception time.

One system for transmitting timing signals between beacons comprises a first beacon that includes: a local clock; a baseband digital hardware module; a DAC module; an up-converter module; an amplifier module; a coupler module with an input and two outputs; a signal router module with two inputs and two outputs; an antenna module; a switch module with two inputs and an output; and a linearization module, wherein the local clock is coupled to the baseband digital hardware module, the baseband digital hardware module is coupled to the DAC module, the DAC module is coupled to the up-converter module, the up-converter module is coupled to the amplifier module, the amplifier module is coupled to the coupler module, the coupler is coupled to the switch module and also to the signal router module, the signal router module is coupled to the antenna module and also to the switch module, and the switch module is coupled to the linearization module.

Details of embodiments are set forth in the drawings and the description below.

BRIEF DESCRIPTION OF THE DRAWINGS

Like reference numbers and designations in the drawings indicate like elements.

DETAILED DESCRIPTION

Many terrestrial communication systems use beacons that transmit radio frequency ("RF" or "radio") signals at certain times and sit "idle" at other times. It follows that the periods of time when a beacon sits idle can be used to perform other useful functions. As disclosed below, a beacon's circuit topology can be modified to allow a beacon to receive and process RF signals from another source (e.g., another beacon) when that beacon is not transmitting its own RF signals. Receiving and processing such RF signals has many uses, some of which are discussed later herein. However, before discussing the modifications to beacon circuit topology, a review of such circuit topology and other features of a terrestrial beacon network are provided below with reference to FIG. 1 and FIG. 2.

Figure 1:
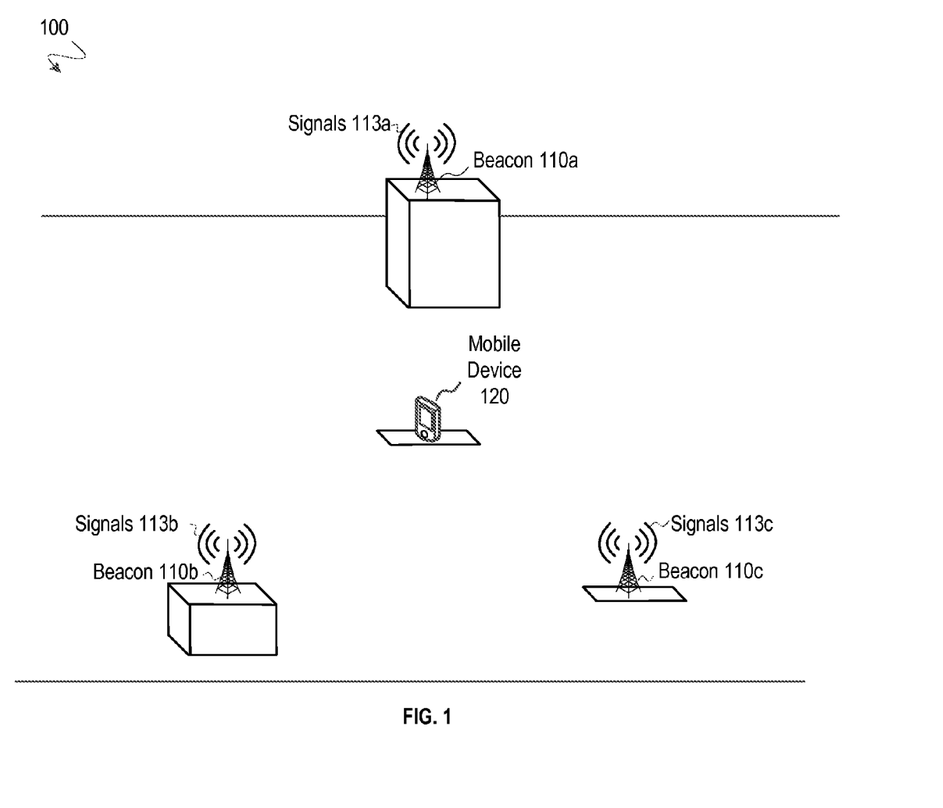
FIG. 1 depicts a terrestrial positioning system used to determine the position of a receiver.

FIG. 1 depicts a terrestrial positioning system used to determine the position of a receiver. As shown, beacons 110 transmit signals 113, which are received by a receiver 120. The receiver 120 may use each of the signals 113 from each of the beacons 110 to compute ranging information that estimates a distance from the receiver 120 to the beacon 110 that transmitted that signal 113 for use during trilateration to compute an initial estimate of the receiver 120's position.

Figure 2:
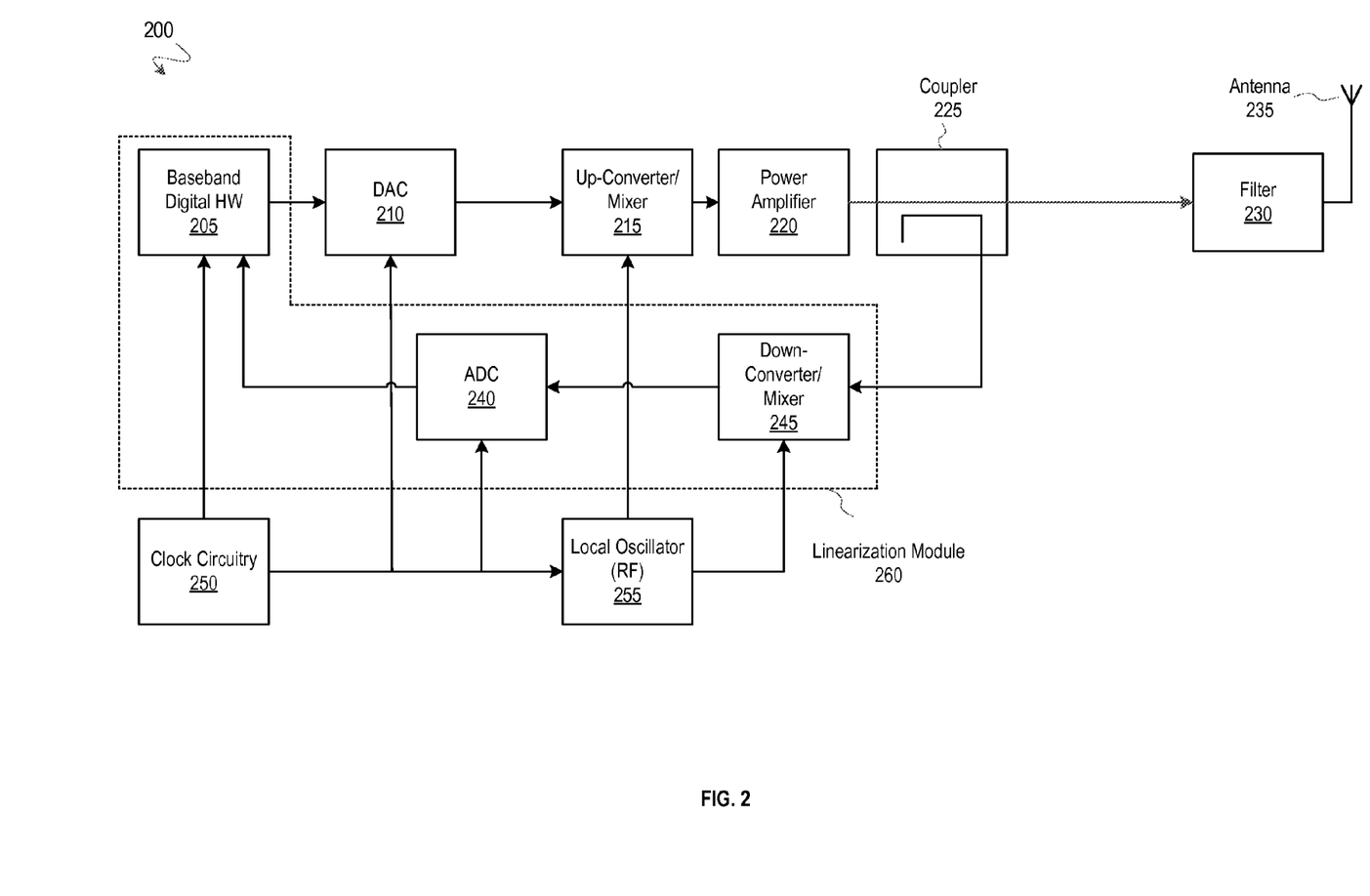
FIG. 2 depicts a typical beacon circuit topology.

By way of example, FIG. 2 depicts a typical circuit topology of a terrestrial beacon 200, which may be implemented by each of the beacons 110 of FIG. 1. Such beacons often use a power amplifier (PA) to transmit the modulated signal over the air for long distances. Some beacons employ linearization techniques using a linearization module (e.g., a digital pre-distortion (DPD) module) to achieve a high degree of linearity in their power amplifiers with an added benefit of reducing power consumption and improved thermal characteristics. Such linearization techniques are implemented in the beacon of the system 200.

In the beacon 200, a digitally modulated baseband signal generated by baseband digital hardware 205 is converted to an analog signal using a digital to analog converter (DAC) 210. The analog signal is then up-converted (e.g., mixed up) to an RF signal of the desired RF frequency using an up-converter 215. The RF signal is then amplified using the power amplifier 220. The amplified RF signal passes through a coupler 225 and is then filtered by a filter 230. Finally, the filtered, amplified RF signal is transmitted over the air through an antenna 235. In one embodiment, the antenna 235 may include one or more filters.

In order to linearize the power amplifier 220 (e.g., using DPD techniques), the power amplifier output is coupled through the coupler 225 to a receive path of a down-converter 245. The down-converter 245 mixes the RF signal down to baseband frequency (or an intermediate frequency, IF). The baseband signal is then received by an analog to digital converter (ADC) 240 which creates a digital representation of the analog baseband signal. The digital representation from the ADC 240 is then used in the baseband digital hardware 205 to "pre-distort" the next transmitted waveform to achieve the desired linearity, using signal processing techniques known in the art.

As previously mentioned, many terrestrial communication systems use beacons that transmit RF signals at certain times and sit "idle" at other times. For example, such systems that re-use the same transmit frequency among the beacons of a network operate using a time-divisional multiple access (TDMA) scheme to minimize the impact of the near-far problem, and thus have transmission and idle periods of time for each beacon. As is disclosed below in relation to FIG. 3, beacon circuit topology like that of FIG. 2, can be modified to allow a beacon to receive and process RF signals from other sources when that beacon is not transmitting its own RF signals.

Figure 3:
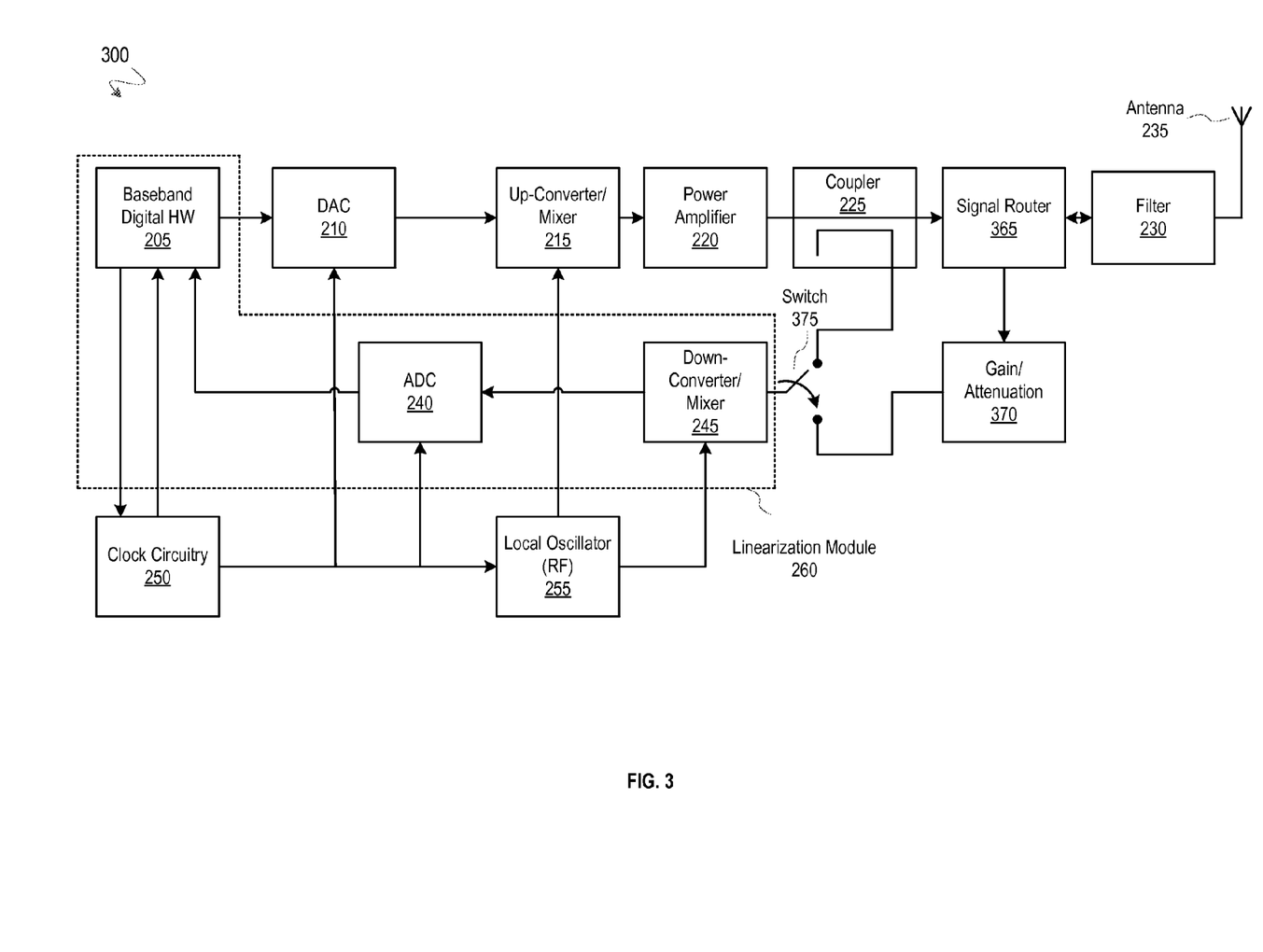
FIG. 3 depicts the beacon circuit topology of FIG. 2 which has been modified to allow the beacon circuitry to process received radio frequency (RF) signals when it is not transmitting RF signals.

FIG. 3 depicts circuitry topology of a beacon 300 that allows the beacon 300 to process received RF signals when the beacon 300 is not transmitting RF signals.

The power amplifier linearization module 260 has a receive chain built in to listen to self-transmission as was described at FIG. 2. With certain modifications to beacon circuit topology, the beacon 300 receives and processes signals from other beacons during when the beacon 300 is not transmitting. In one embodiment, if the transmitted signal power of the beacon 300 is low enough, the beacon 300 can receive signals transmitted from other beacons while the beacon is transmitting.

As shown in FIG. 3, the beacon 300 includes components previously described in relation to FIG. 2. The beacon 300 also includes a signal router 365 (e.g., an RF circulator, switches, or RF isolators) which may help protect the PA 220 from reflections from the antenna 235. Using the signal router 365 one can use the isolated path of the signal router 365 to receive signals from other beacons when the beacon is not transmitting RF signals. Alternative embodiments include other hardware components, such as RF isolators or switches, which can provide an isolated path for signals received from other beacons by the antenna 235.

The beacon 300 also includes a signal gain/attenuation component 370 (e.g., a signal conditioning component such as an Auto-Gain Control (AGC)). Based on the received signal strength, a gain or attenuation factor may be applied using the gain/attenuation component 370 to be able to receive both strong and weak signals from other beacons. In some embodiments, the gain/attenuation component 370 may be switched off when the power amplifier 220 is operating to prevent the output signal of the power amplifier from damaging the gain/attenuation component 370.

The beacon 300 further includes a switch 375 that may be used to selectively configure the beacon 300 to send or receive RF signals. Such a switch may be a relay; it may be a solid state switch; it may be a buffered circuit, or it may be any other suitable means which allows an RF signal to be selectively routed to multiple paths.

Using this modified beacon topology for the beacon 300, RF signals received at the antenna 235 will flow through the filter 230 to the signal router 365, and will then flow from the isolated path of the signal router 365 to the gain/attenuation component 370.

If the switch 375 is configured to route the received signals to the down-converter 245, the signals may be then processed using the existing power amplifier linearization module 260 to extract any digital data what was conveyed in the received RF signal. By way of example, such data may contain, or support, time of arrival estimates which can then be used for two-way time transfer techniques as will be described with reference to FIG. 10. Time synchronization data generated with such techniques may be used to control the clock circuitry 250 (e.g., a local clock) such that the clock circuitry 250 remains in synchronization with the clock circuitry of other beacons in both time and frequency. The baseband digital hardware 205 is enabled to supply clock synchronization signals/commands to the clock circuitry 250.

In an alternative embodiment, an independent receiver (not shown) is coupled to the signal router 365 to receive signals received at the antenna 235.

The circuitry shown in FIG. 3 permits enhancements in the way beacons are synchronized, since received data processed at the baseband digital hardware 205 may be used to synchronize the local clocks of beacons of a network to each other using two-way time transfer techniques. Other uses of received data have been contemplated, including uses of received data for monitoring the health of the beacon network.

Particular processes for time synchronizing beacons are described later with reference to FIG. 9, FIG. 10 and FIG. 11. However, various systems depicted in FIG. 4, FIG. 5, FIG. 6, FIG. 7 and FIG. 8 are first discussed below to provide context for such time synchronizing processes.

Systems for Beacon Clock Synchronization Using Two-way Time Transfer

Figure 4:
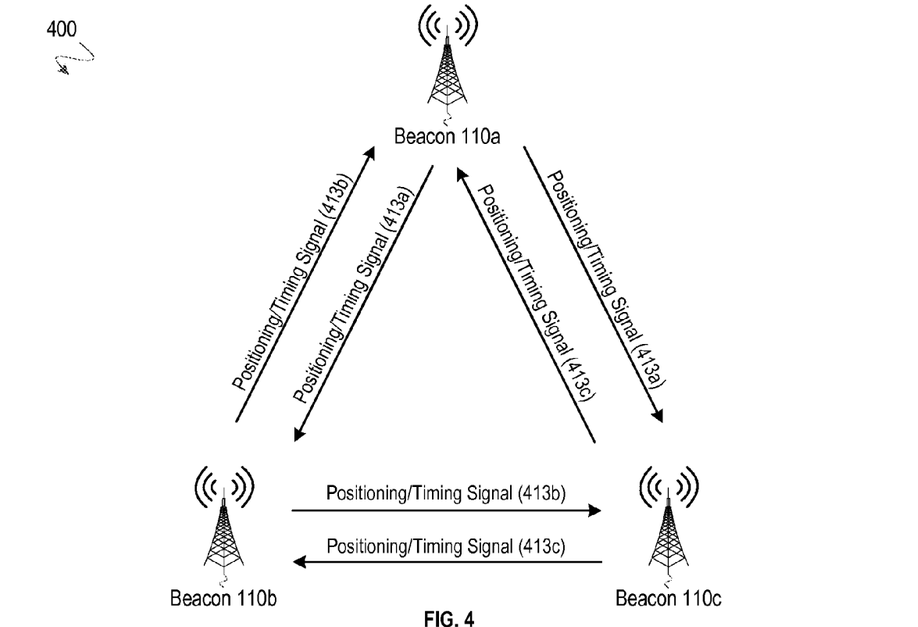
FIG. 4 depicts beacons of the terrestrial positioning system exchanging positioning and/or timing signals between themselves to synchronize their clocks relative to each other using two-way time transfer.
Figure 5:
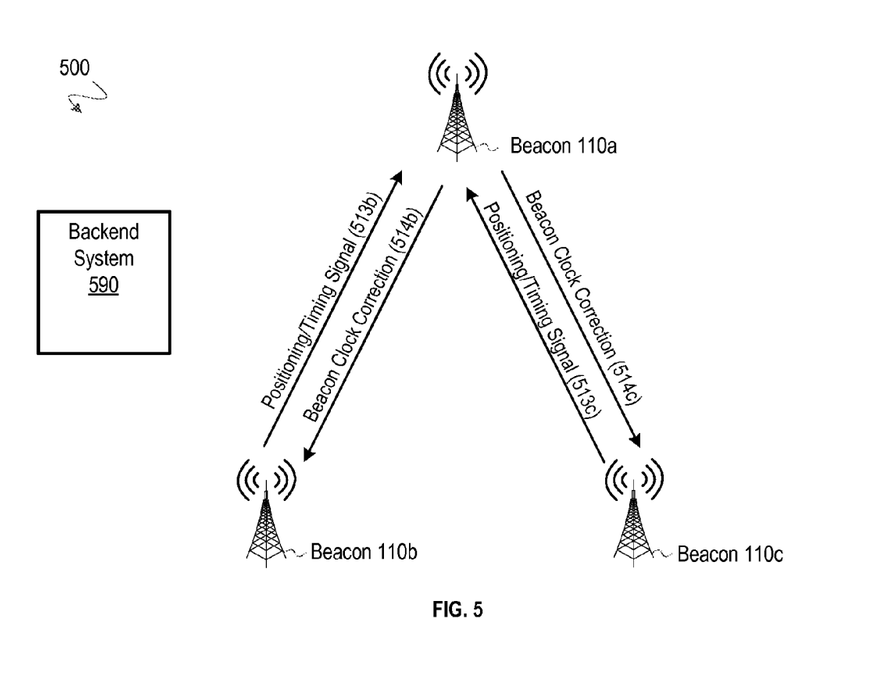
FIG. 5 depicts beacons sending positioning/timing signals to a single beacon of the network which in turn returns clock synchronization corrections to the other beacons.

FIG. 4 and FIG. 5 depict systems for beacon clock synchronization using two-way time transfer. Processes for time synchronization implemented by the systems shown in FIG. 4 and FIG. 5 are discussed in relation to FIG. 10.

FIG. 4 depicts the beacons 110a-c exchanging positioning and/or timing signals 413 between themselves to synchronize their clocks relative to each other using two-way time transfer techniques.

FIG. 5 depicts beacons the 110b and 110c sending positioning/timing signals 513 to the beacon 110a of the network which in turn returns clock synchronization corrections 514 to the beacons 110b and 110c.

Systems for Beacon Clock Synchronization to a Network Clock Time

Figure 6:
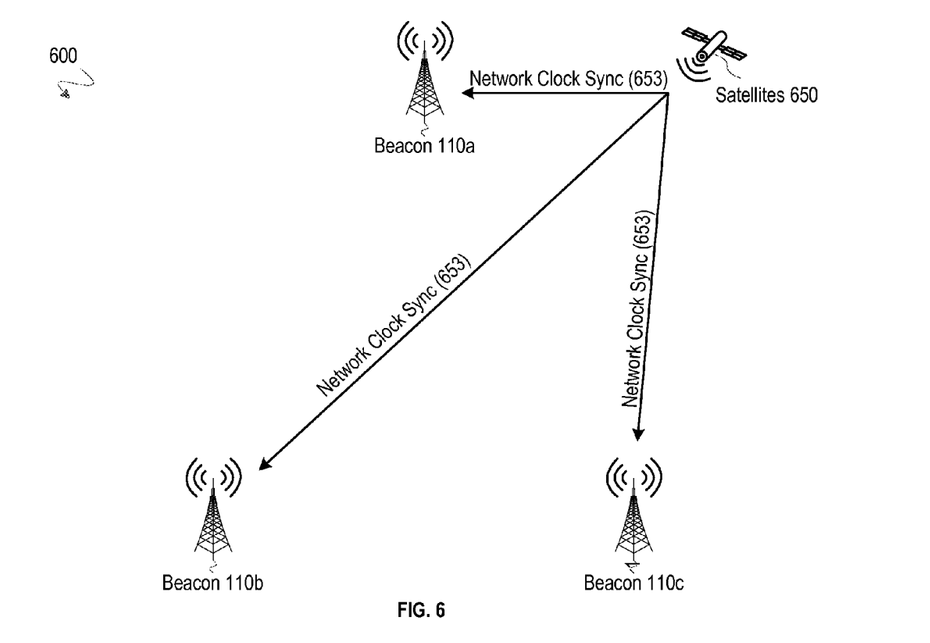
FIG. 6 depicts beacons of the terrestrial positioning system receiving a network/global time synchronization setting from a satellite beacon.
Figure 7:
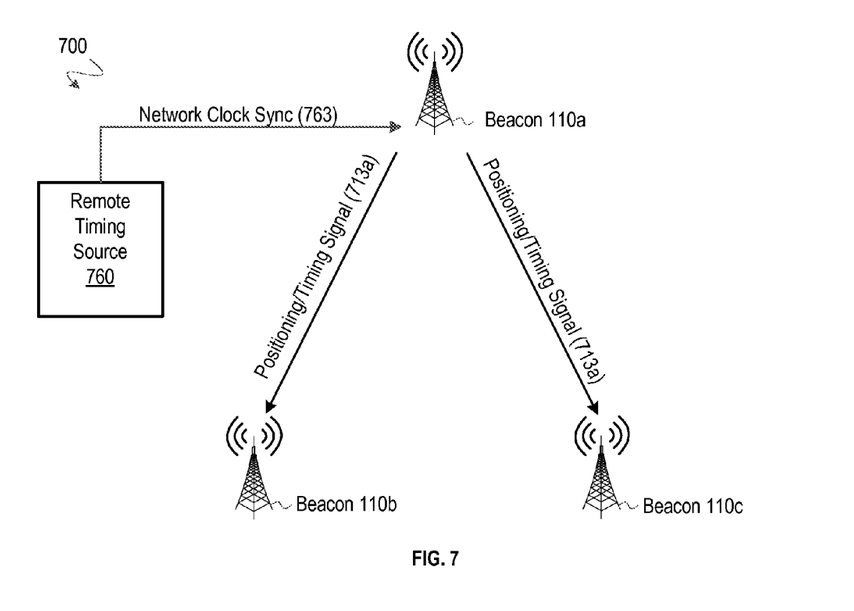
FIG. 7 depicts beacons of the terrestrial positioning system receiving a network/global time synchronization setting from a remote timing source.
Figure 8:
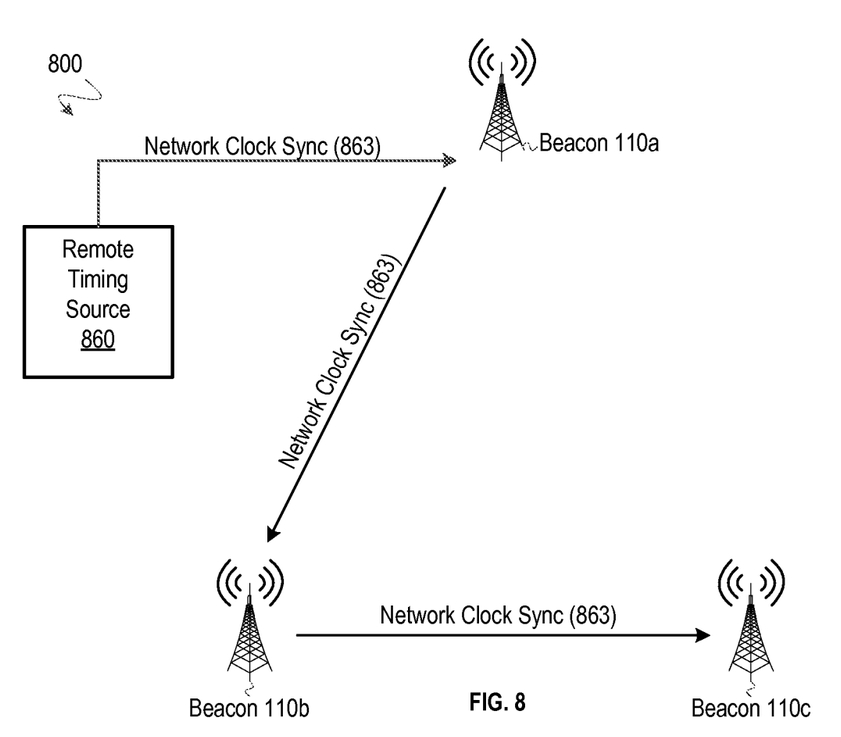
FIG. 8 depicts beacons of the terrestrial positioning system receiving, and relaying, a network/global time synchronization setting from a remote timing source.

FIG. 6, FIG. 7 and FIG. 8 depict systems for beacon clock synchronization to a network clock time. Processes for time synchronization implemented by the systems shown in FIG. 6, FIG. 7 and FIG. 8 are discussed at FIG. 11.

FIG. 6 depicts the beacons 110a-c receiving a network/global time synchronization setting 653 from a satellite 650.

FIG. 7 depicts the beacons 110a-c receiving a network/global time synchronization setting 763 from a remote timing source 760. As shown, the network clock synchronization signal 763 is first received by the beacon 110a. The beacon 110a uses the network clock synchronization signal 763 to synchronize its clock to the network/global time conveyed in the network clock synchronization signal 763. Thereafter, positioning/timing signal 713a transmitted to the beacon 110b and the beacon 110c will be synchronized to the network/global time. The remote timing source can be a timing source from a satellite network or a terrestrial network. For example, a satellite of the GNSS, a terrestrial satellite terminal, a terrestrial server, a terrestrial reference clock, or another reference timing source as is known in the art.

FIG. 8 depicts the beacons 110a-c receiving and relaying a network/global time synchronization setting 863 from a remote timing source 860. As shown, network clock synchronization signal 863 is first received by the beacon 110a, which then in turn signal to the beacon 110b, which in turn relays the signal to the beacon 110c, and so on for additional beacons (not shown).

Selectively Configuring RF Signal Transmission and Reception

Figure 9:
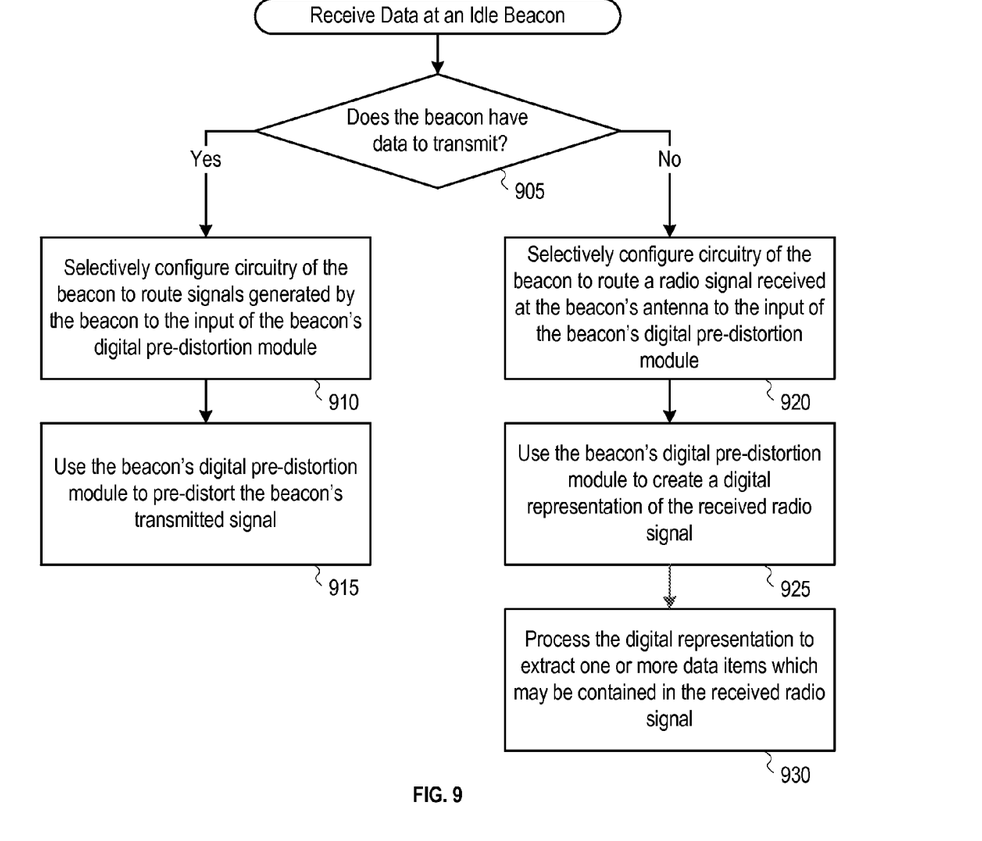
FIG. 9 details a process for identifying data items transmitted by RF signals received at a beacon when the beacon is not transmitting RF signals.

Attention is now drawn to FIG. 9, which details a process for identifying data (also referred to as "data items") transmitted by RF signals received at a beacon when the beacon is not transmitting RF signals. Such a system is supported by the beacon circuit topology illustrated in FIG. 3.

The process includes the step of: determining if the beacon has data to transmit (step 905). If the beacon has data to transmit, the process proceeds to the steps of: selectively configuring circuitry of the beacon to route signals generated by the beacon to the input of the beacon's digital pre-distortion module (step 910); and using the beacon's digital pre-distortion module to pre-distort the beacon's transmitted signal (step 915). If the beacon does not have data to transmit, the process proceeds to the steps of: selectively configuring the circuitry of the beacon to route a RF signal received at the beacon's antenna to the input of the beacon's digital pre-distortion module (step 920); using the beacon's digital pre-distortion module to create a digital representation of the received RF signal (step 925); and processing the digital representation to extract one or more data items which may be contained in the received RF signal (step 930). In one embodiment, the circuitry of the beacon is "selectively configured" in steps 910 and 920 using the switch 375 shown in FIG. 3.

Figure 10:
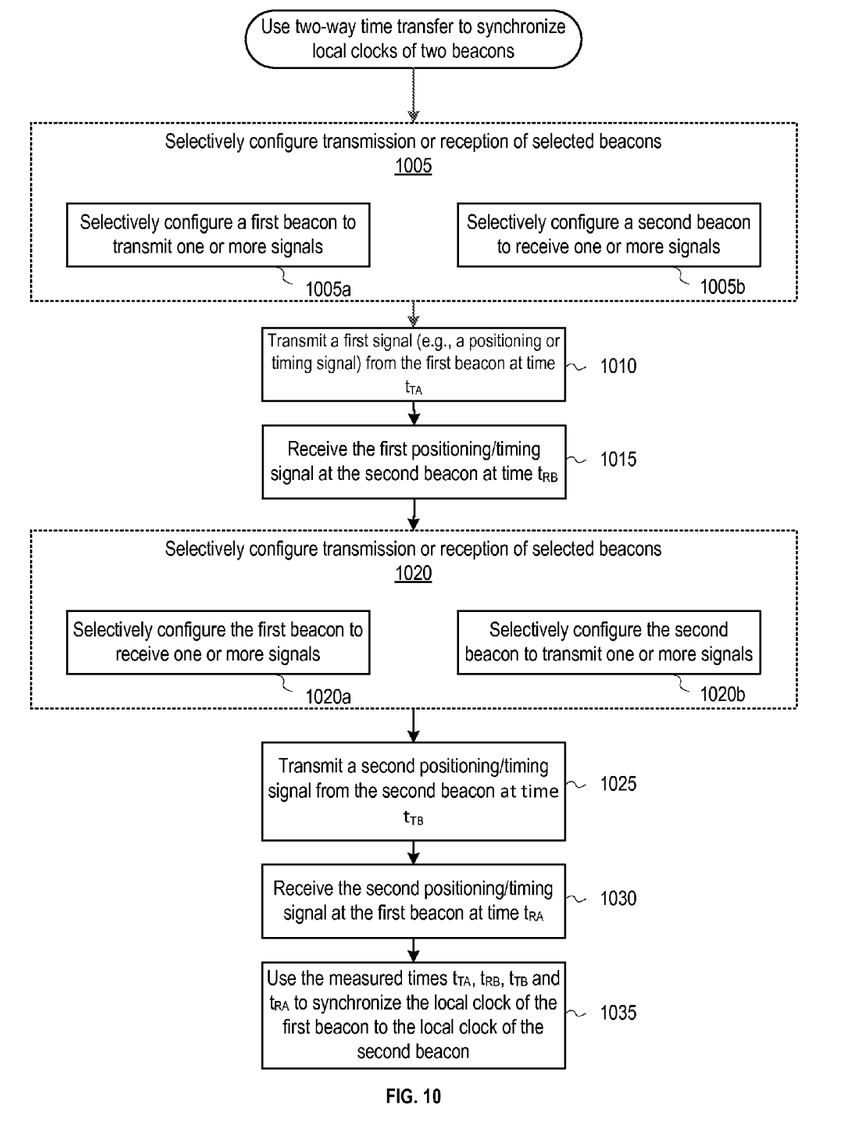
FIG. 10 details a process for using two-way time transfer to synchronize the local clocks of two beacons.

Selectively Transmitting and Receiving RF Signals at a Beacon in Support of Clock Synchronization Using Two-way Time Transfer FIG. 10 details a process for using two-way time transfer to synchronize the local clocks (clock circuitry) of two beacons. The process includes the steps of: selectively configuring a first beacon to transmit one or more signals (step 1005a); selectively configuring a second beacon to receive one or more signals (step 1005b); transmitting a first signal (e.g., a positioning or timing signal) from the first beacon at time $t_{TA}$ (step 1010); receiving the first signal at the second beacon at time $t_{RB}$ (step 1015); selectively configuring the first beacon to receive one or more signals (step 1020a); selectively configuring the second beacon to transmit one or more signals (step 1020b); transmitting a second signal from the second beacon at time $t_{TB}$ (step 1025); receiving the second signal at the first beacon at time $t_{RA}$ (step 1030); and using the measured times $t_{TA}$, $t_{RB}$, $t_{TB}$ and $t_{RA}$ to synchronize the local clock of the first beacon to the local clock of the second beacon (step 1035).

Using such techniques, the clocks of terrestrial beacons can be synchronized with each other. Due to imperfections (e.g., propensity to drift, oscillator/crystal errors, etc.) in beacon clock hardware, the time scale of a beacon's local clock relative to other beacon's clocks may be different. These imperfections may cause a loss in time synchronization between the beacons, which can reduce the effectiveness of the network for positioning and its other uses.

To elaborate on the above process using a simplified example, consider the beacons 110a and 110b of the beacons shown in FIG. 4. Each of the beacons 110a and 110b includes hardware and circuitry capable of RF signal transmission. Using the modifications to the circuitry of the beacons as illustrated in FIG. 3, and further using the method to selectively configure the circuitry to send or receive RF signals as described at FIG. 9 and FIG. 10, each beacon can be selectively configured to transmit data when it has data to transmit, and receive data when it does not have data to transmit.

At a first time, the beacon 110a is selectively configured to transmit signals and the beacon 110b is selectively configured to receive signals. The beacon 110a transmits the signal 413a (e.g., a positioning or timing signal) at time $t_{TA}$ as measured using the local time of the beacon 110a's clock. The beacon 110b receives the signal 413a at time $t_{RB}$ as measured using the local time of the beacon 110b's clock. By way of example, the positioning or timing signals may include a representation of that beacon's respective location, the time of transmission of the signal as measured at that beacon, and other information as is known in the art.

At a second time, the beacon 110a is selectively configured to receive signals and the beacon 110b is selectively configured to transmit signals. The beacon 110b then transmits the signal 413b at time $t_{TB}$ as measured using the local time of the beacon 110b's clock. The beacon 110a receives the positioning/timing signal 413b at time $t_{RA}$ as measured using the local time of the beacon 110a's clock.

A receiving beacon's processing latency for each of the signals may be fixed or variable, but the latency can be accurately estimated using methods known in the art.

The difference in beacon clock time scale for beacons 110a and 110b will be denoted as $\Delta t_{AB}$. In order to synchronize the clocks of the beacon 110a and the beacon 110b, $\Delta t_{AB}$ must be determined In the equations that follow, that the distance between the beacon 110a and the beacon 110b is R meters, and the speed of light (modeled for electromagnetic wave propagation) is c. Thus:

$$t_{RB} = t_{TA} - \Delta t_{AB} + \frac{R}{c} \quad \text{(Equation 1)}$$

$$t_{RA} = t_{TB} + \Delta t_{AB} + \frac{R}{c}. \quad \text{(Equation 2)}$$

Adding Equation 1 and Equation 2 yields:

$$t_{RA} - t_{TB} + t_{RB} - t_{TA} = \frac{2R}{c}. \quad \text{(Equation 3)}$$

And subtracting Equation 1 and Equation 2 yields:

$$t_{RA} - t_{TB} - t_{RB} + t_{TA} = 2\Delta t_{AB} \quad \text{(Equation 4).}$$

By inserting the actual measured timestamp parameters $t_{RA}$, $t_{TB}$, $t_{RB}$ and $t_{TA}$ into Equation 4, the value of $\Delta t_{AB}$ may be determined and corrected for to synchronize the clocks of the beacons 110a and 110b. This process may then be repeated between other beacons of the network.

Additionally, Equation 3 may be used as a way of measuring the range R between the beacons and can be used to bound the accuracy of the measurement of $\Delta t_{AB}$ or to validate the measurements used in determining $\Delta t_{AB}$.

In terrestrial beacons involving range estimation, multipath is a major factor that affects the measurement of the time of arrival parameters $t_{RA}$ and $t_{RB}$. However, in this case, since the beacon 110a and the beacon 110b use the same antennas to transmit and receive signals, multipath cancels out so long as the channel between the beacons is reciprocal and the inaccuracies in estimation of the time of arrivals will not factor into the accuracy of the two-way time transfer.

Inaccuracies in beacon and receiver electronics across component variations and temperature variations may be corrected for using a pre-calibrated lookup table that accounts for these variations.

Computing the value of $\Delta t_{AB}$ as described above could take place at each beacon (e.g., using the baseband digital hardware 205). Alternatively, the measured times of transmission and reception could be sent to a single beacon of the network, or to a backend system 590 of the network (e.g., a server), which takes all of the time transfer information from various beacons within a region and computes the correction information and sends it back to the beacons within the region. Such a system is illustrated in FIG. 5.

Selectively Transmitting and Receiving Signals at a Beacon in Support of Beacon Clock Synchronization to a Network Clock Time In some embodiments, there may be need to synchronize all of the beacons of a network to a single common "network time" such as the Coordinated Universal Time (UTC).

Figure 11:
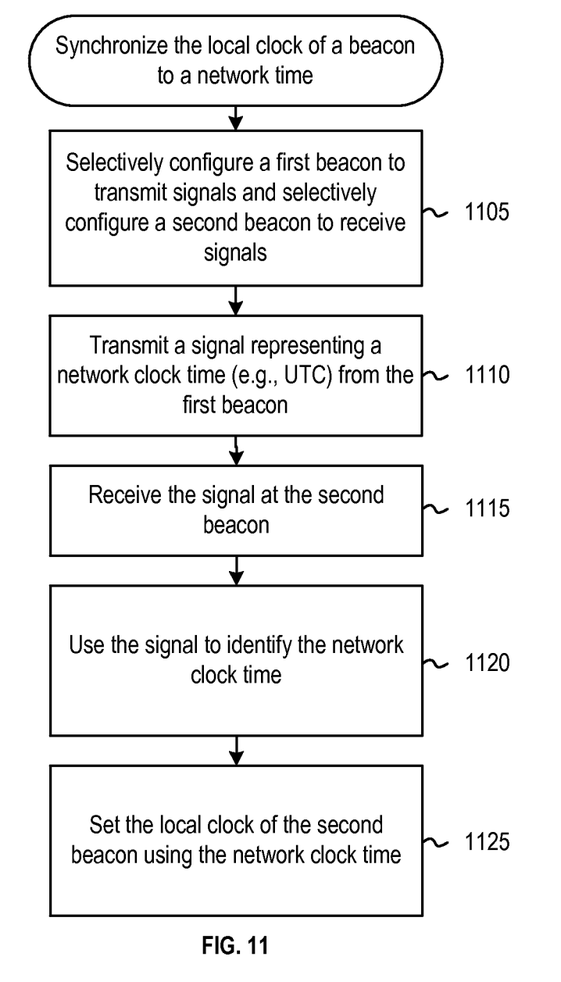
FIG. 11 details a process for synchronizing local clocks of beacons to network time.

FIG. 11 details a process for synchronizing the local clock circuitry of a beacon to a network clock time. Example systems that illustrate synchronizing a beacon to a network time are shown in FIG. 6, FIG. 7 and FIG. 8.

The steps of the process include: selectively configuring a first beacon to transmit signals and selectively configuring a second beacon to receive signals (step 1105); transmitting a signal representing a network clock time (e.g., UTC) from the first beacon (step 1110); receiving the signal at the second beacon (step 1115); using the signal to identify the network clock time (step 1120); and setting the local clock of the second beacon using the network clock time (step 1125).

By way of example, use of a remote timing source to synchronize beacons of a network is illustrated in FIG. 7 and FIG. 8. In these figures, the beacon 110a receives a network clock synchronization signal 763 or 863 from the remote timing source 760 or 860 which includes a high precision timing source (e.g., a timing source having greater long-term accuracy than the local clock of the beacon 110a). The beacon 110a then relays the network clock synchronization signal 763 or 863 to at least one beacon of the network.

An extension of this concept includes providing the remote timing source 760 or 860 with a high grade clock source (e.g., a timing source having at least a threshold amount of long-term accuracy, such as a Cesium or a Hydrogen Maser based timing source) that synchronizes to UTC (e.g., once a year) and becomes the main timing source for time synchronization signals for beacons within a region, thus allowing the beacons within the region to use a lower quality/cheaper clock.

As shown in FIG. 6, an alternative way of synchronizing the beacons to UTC is to use a GNSS timing receiver at each beacon site, since a GNSS receiver can provide signals synchronized to UTC. Alternatively, the satellite timing source could be the timing information from an Iridium satellite. An embodiment illustrating receiving a network clock synchronization signal 653 from a satellite system 650 is shown at FIG. 6.

Another timing source that could be used is the Two-Way Satellite Time Transfer (TWSTT) VSAT terminal (not shown), provided as a service by the United States Naval Observatory (USNO).

Examples of Other Features in Some Embodiment

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s). Systems (e.g., apparatuses or components thereof) operable to implement the method(s) are also contemplated.

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s), system(s) or other means may perform the following or be operable perform the following: transmitting a first timing signal from a first beacon; receiving the first timing signal at a second beacon; using a time measured by a local clock of the first beacon to identify a first transmission time when the first beacon transmitted the first timing signal; using a time measured by a local clock of the second beacon to identify a first reception time when the second beacon received the first timing signal; transmitting a second timing signal from the second beacon; receiving the second timing signal at the first beacon; using another time measured by the local clock of the second beacon to identify a second transmission time when the second beacon transmitted the second timing signal; using another time measured by the local clock of the first beacon to identify a second reception time when the first beacon received the second timing signal; and synchronizing the local clock of the first beacon with the local clock of the second beacon based on the first transmission time, the first reception time, the second transmission time, and the second reception time.

In one embodiment, the synchronizing comprises: using a server to synchronize the local clock of the first beacon and the local clock of the second beacon based on the first transmission time, the first reception time, the second transmission time, and the second reception time.

In one embodiment, the synchronizing comprises: using the first beacon to synchronize the local clock of the first beacon with the local clock of the second beacon based on the first transmission time, the first reception time, the second transmission time, and the second reception time.

In one embodiment, the synchronizing comprises: using the second beacon to synchronize the local clock of the second beacon with the local clock of the first beacon based on the first transmission time, the first reception time, the second transmission time, and the second reception time.

In one embodiment, the synchronizing comprises: using a third beacon to synchronize the local clock of the first beacon and the local clock of the second beacon based on the first transmission time, the first reception time, the second transmission time, and the second reception time.

Method(s), system(s) or other means may further or alternatively perform the following or be operable to perform the following: receiving, prior to transmitting the first timing signal from the first beacon, a network time at the first beacon; and synchronizing, prior to transmitting the first timing signal from the first beacon, the local clock of the first beacon to the network time, wherein the network time received at the first beacon is transmitted from a satellite network.

Method(s), system(s) or other means may further or alternatively perform the following or be operable to perform the following: receiving, prior to transmitting the second timing signal from the second beacon, a network time at the second beacon; and synchronizing, prior to transmitting the second timing signal from the second beacon, the local clock of the second beacon to the network time, wherein the network time received at the second beacon is transmitted from a satellite network.

Method(s), system(s) or other means may further or alternatively perform the following or be operable to perform the following: receiving, prior to transmitting the first timing signal from the first beacon, a network time at the first beacon; and synchronizing, prior to transmitting the first timing signal from the first beacon, the local clock of the first beacon to the network time, wherein the network time received at the first beacon is transmitted from a terrestrial network.

Method(s), system(s) or other means may further or alternatively perform the following or be operable to perform the following: receiving, prior to transmitting the second timing signal from the second beacon, a network time at the second beacon; and synchronizing, prior to transmitting the second timing signal from the second beacon, the local clock of the second beacon to the network time, wherein the network time received at the second beacon is transmitted from a terrestrial network.

Method(s), system(s) or other means may further or alternatively perform the following or be operable to perform the following: receiving, prior to transmitting the first timing signal from the first beacon, a network time at the first beacon; and synchronizing, prior to transmitting the first timing signal from the first beacon, the local clock of the first beacon to the network time, wherein the network time received at the first beacon is transmitted from a timing source having greater long-term accuracy than the local clock of the first beacon.

Method(s), system(s) or other means may further or alternatively perform the following or be operable to perform the following: receiving, prior to transmitting the second timing signal from the second beacon, a network time at the second beacon; and synchronizing, prior to transmitting the second timing signal from the second beacon, the local clock of the second beacon to the network time, wherein the network time received at the second beacon is transmitted from a timing source having greater long-term accuracy than the local clock of the second beacon.

By way of example, not by way of limitation, method(s), system(s) or other means may perform the following or be operable perform the following: determining whether signal transmission from an antenna of the first beacon is scheduled during a first time period; upon determining that signal transmission from the antenna of the first beacon is not scheduled during the first time period, configuring the first beacon to route a first radio signal received from a second beacon at the antenna to an input of a linearization module of the first beacon during the first time period; using the linearization module to create a digital representation of the first radio signal; and using a baseband digital hardware module of the first beacon to identify one or more data items in the digital representation. In one embodiment, the linearization module is a digital pre-distortion linearization module.

Method(s), system(s) or other means may further or alternatively perform the following or be operable to perform the following: determining whether signal transmission from the antenna of the first beacon is scheduled during a second time period; and after determining that signal transmission from the antenna of the first beacon is scheduled during the second time period: configuring the first beacon to route a second radio signal generated by the first beacon to the input of the linearization module during the second time period, and transmitting the second radio signal from the antenna during the second time period Method(s), system(s) or other means may further or alternatively perform the following or be operable to perform the following: the first radio signal is a first timing signal generated by the second beacon, and wherein the second radio signal is a second timing signal generated by the first beacon.

Method(s), system(s) or other means may further or alternatively perform the following or be operable to perform the following: identifying a first transmission time when the second beacon transmitted the first timing signal; identifying a first reception time when the first beacon received the first timing signal; identifying a second transmission time when the first beacon transmitted the second timing signal; identifying a second reception time when the second beacon received the second timing signal; and synchronizing a local clock of the first beacon using the first transmission time, the first reception time, the second transmission time, and the second reception time.

By way of example, one or more systems may comprise hardware modules that perform the methods or particular steps of the methods disclosed herein.

In one embodiment, one or more systems include: a local clock; a baseband digital hardware module; a DAC module; an up-converter module; an amplifier module; a coupler module with an input and two outputs; a signal router module with two inputs and two outputs; an antenna module; a switch module with two inputs and an output; and a linearization module.

In one embodiment, the local clock is coupled to the baseband digital hardware module, the baseband digital hardware module is coupled to the DAC module, the DAC module is coupled to the up-converter module, the up-converter module is coupled to the amplifier module, the amplifier module is coupled to the coupler module, the coupler is coupled to the switch module and also to the signal router module, the signal router module is coupled to the antenna module and also to the switch module, and the switch module is coupled to the linearization module.

In one embodiment, an input of the local clock is coupled to an output of the baseband digital hardware module, an output of the local clock is coupled to an input of the baseband digital hardware module; another output of the baseband digital hardware module is coupled to an input of the DAC module, an output of the DAC module is coupled to an input of the up-converter module, an output of the up-converter module is coupled to an input of the amplifier module, an output of the amplifier module is coupled to the input of the coupler module, a first output of the coupler is coupled to a first input of the switch module, a second output of the coupler is coupled to a first input of the signal router module, a first output of the signal router module is coupled to an input of the antenna module, an output of the antenna module is coupled to a second input of the signal router module, a second output of the signal router module is coupled to a second input of the switch module, and the output of the switch module is coupled to an input of the linearization module.

In one embodiment, the switch module is operable in a first mode to route a first type of signal received at a first input of the switch module to an output of the switch module, the switch module is operable in a second mode to route a second type of signal received at a second input of the switch module to the output of the switch module, the first type of signal is a radio signal generated by the first beacon, and the second type of signal is a radio signal received at the antenna module of the first beacon.

In one embodiment, the signal router module is operable to route a first type of signal received at the first input of the signal router module to the first output of the signal router module, and the signal router module is further operable to route a second type of signal received at the second input of the signal router module to the second input of the signal router module, the first type of signal is a radio signal generated by the first beacon, and the second type of signal is a radio signal received at the antenna module of the first beacon.

In one embodiment, the signal router module comprises an RF circulator, one or more RF isolators, or one or more switches.

In one embodiment, the baseband digital hardware module is operable to determine whether signal transmission from the antenna module to a second beacon is scheduled during a first time period, the switch module is operable to route a first radio signal from the antenna module to the input of the linearization module during the first period of time, the linearization module is operable to create a digital representation of the first radio signal, the baseband digital hardware module is operable to identify one or more data items in the digital representation, the baseband digital hardware module is operable to determine whether signal transmission from the antenna module to the second beacon is scheduled during a second time period, the switch module is operable to route a second radio signal generated by the first beacon to the input of the linearization module during the second time period, and the antenna module is operable to transmit the second radio signal to the second beacon during the second time period.

In one embodiment, the first beacon is operable to transmit a first timing signal from the antenna module to a second beacon; the second beacon is operable to receive the first timing signal; a local clock module of the second beacon is operable to identify a first reception time of the first timing signal at the second beacon; the local clock module of the first beacon is operable to identify a first transmission time of the first timing signal from the first beacon; the second beacon is operable to transmit a second timing signal; the first beacon is operable to receive the second timing signal; a local clock module of the first beacon is operable to identify a second reception time of the second timing signal at the first beacon; the local clock module of the second beacon is operable to identify a second transmission time of the second timing signal from the second beacon; and the first beacon and the second beacon are operable to synchronize the local clock module of the first beacon and the local clock module of the second beacon based on the first transmission time, the first reception time, the second transmission time, and the second reception time.

The one or more systems may further or alternatively include: a receiver module with an input coupled to an output of the antenna module, and an output coupled to an input of the baseband digital hardware module.

In one embodiment, the receiver module is operable to receive a first type of radio signal from the antenna module while the antenna module is transmitting a second type of radio signal, and the receiver module is operable to generate a digital representation of the received radio signal of the first type.

In one embodiment, the first type of radio signal is a timing signal transmitted from a second beacon, and the second type of radio signal is a timing signal generated by the first beacon.

In one embodiment, each module includes one or more inputs to receive information used to perform what it is operable to do, and further includes one or more outputs to send information to other modules.

A "receiver" may be in the form of a computing device (e.g., a mobile phone, a tablet, a PDA, a laptop, a digital camera, a tracking tag). A receiver may also take the form of any component of the computer, including a processor.

Processing by the receiver can also occur at a server.

The illustrative methods described herein may be implemented, performed, or otherwise controlled by suitable hardware known or later-developed by one of skill in the art, or by firmware or software executed by processor(s), or any combination of hardware, software and firmware. Software may be downloadable and non-downloadable at a particular system. Such software, once loaded on a machine, changes the operation of that machine.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

All of the information disclosed herein may be represented by data, and that data may be transmitted over any communication pathway using any protocol, stored on data source(s), and processed by a processor. Transmission of data may be carried out using a variety of wires, cables, radio signals and infrared light beams, and an even greater variety of connectors, plugs and protocols even if not shown or explicitly described. Systems may exchange information with each other using any communication technology. Data, instructions, commands, information, signals, bits, symbols, and chips and the like may be represented by voltages, currents, electromagnetic waves, magnetic fields or particles, or optical fields or particles.

Features in system figures that are illustrated as rectangles may refer to hardware, firmware or software. It is noted that lines linking two such features may be illustrative of data transfer between those features. Such transfer may occur directly between those features or through intermediate features. Where no line connects two features, transfer of data between those features is contemplated unless otherwise stated.

When two things (e.g., modules, circuit elements, etc.) are "coupled to" each other, those two things may be directly connected together, or may be separated by one or more intervening things. Thus, no direct connection is required between the two things. Where an output and an input are coupled to each other, data and/or signaling sent from the output is received by the input even if the data passes through one or more intermediate things.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

Related Applications

This application relates to U.S. patent application Ser. No. 62/089,138, filed Dec. 8, 2014, entitled TWO WAY TIME TRANSFER USING A TERRESTRIAL BEACON SYSTEM, the content of which is hereby incorporated by reference herein in its entirety.

The invention claimed is:

1. A method for synchronizing the local time of beacons, the method comprising:
   determining whether signal transmission from an antenna of a first beacon is scheduled during a first time period;
   after determining that signal transmission from the antenna of the first beacon is scheduled during the first time period, transmitting a first timing signal from the first beacon;
   receiving the first timing signal at a second beacon during the first time period;
   using a time measured by a local clock of the first beacon to identify a first transmission time when the first beacon transmitted the first timing signal;
   using a time measured by a local clock of the second beacon to identify a first reception time when the second beacon received the first timing signal;
   transmitting a second timing signal from the second beacon during a second time period;
   determining whether signal transmission from the antenna of the first beacon is scheduled during the second time period;
   after determining that signal transmission from the antenna of the first beacon is not scheduled during the second time period, configuring the first beacon to route the second timing signal to an input of a linearization module of the first beacon during the second time period by configuring a switch of the first beacon to route the second timing signal from a signal gain or attenuation component of the first beacon, through the switch, and to a down-converter of the linearization module, using the linearization module to create a digital representation of the second timing signal, and using a baseband digital hardware module of the first beacon to identify one or more data items in the digital representation;

using another time measured by the local clock of the second beacon to identify a second transmission time when the second beacon transmitted the second timing signal;

using another time measured by the local clock of the first beacon to identify a second reception time when the first beacon received the second timing signal; and synchronizing the local clock of the first beacon with the local clock of the second beacon based on at least the first transmission time, the first reception time, the second transmission time, and the second reception time.

2. The method of claim 1, wherein the synchronizing comprises: using a server to synchronize the local clock of the first beacon and the local clock of the second beacon based on the first transmission time, the first reception time, the second transmission time, and the second reception time.

3. The method of claim 1, wherein the synchronizing comprises: using the first beacon or the second beacon to synchronize the local clock of the first beacon with the local clock of the second beacon based on the first transmission time, the first reception time, the second transmission time, and the second reception time.

4. The method of claim 1, wherein the synchronizing comprises: using a third beacon to synchronize the local clock of the first beacon and the local clock of the second beacon based on the first transmission time, the first reception time, the second transmission time, and the second reception time.

5. The method of claim 1, wherein the method comprises:
receiving, prior to transmitting the first timing signal from the first beacon, a network time at the first beacon; and
synchronizing, prior to transmitting the first timing signal from the first beacon, the local clock of the first beacon to the network time,
wherein the network time received at the first beacon is transmitted from a satellite network or a terrestrial network.

6. The method of claim 1, wherein the method comprises:
receiving, prior to transmitting the second timing signal from the second beacon, a network time at the second beacon; and
synchronizing, prior to transmitting the second timing signal from the second beacon, the local clock of the second beacon to the network time,
wherein the network time received at the second beacon is transmitted from a satellite network or a terrestrial network.

7. The method of claim 1, wherein the method comprises:
receiving, prior to transmitting the first timing signal from the first beacon, a network time at the first beacon; and
synchronizing, prior to transmitting the first timing signal from the first beacon, the local clock of the first beacon to the network time,
wherein the network time received at the first beacon is transmitted from a timing source having greater long-term accuracy than the local clock of the first beacon.

8. The method of claim 1, wherein the method comprises:
receiving, prior to transmitting the second timing signal from the second beacon, a network time at the second beacon; and
synchronizing, prior to transmitting the second timing signal from the second beacon, the local clock of the second beacon to the network time,
wherein the network time received at the second beacon is transmitted from a timing source having greater long-term accuracy than the local clock of the second beacon.

9. The method of claim 1, wherein after determining that signal transmission from the antenna of the first beacon is scheduled during the first time period, the method comprises:
generating the first timing signal at the first beacon; and
configuring the first beacon to route the first timing signal to the input of the linearization module during the first time period by configuring the switch of the first beacon to route the first timing signal from a coupler of the first beacon, through the switch, and to the down-converter of the linearization module.

10. One or more non-transitory processor-readable media embodying program instructions that, when executed by one or more processors, cause the one or more processors to implement a method for synchronizing the local time of beacons, the method comprising:
determining whether signal transmission from an antenna of a first beacon is scheduled during a first time period;
after determining that signal transmission from the antenna of the first beacon is scheduled during the first time period, transmitting a first timing signal from the first beacon;
receiving the first timing signal at a second beacon during the first time period;
using a time measured by a local clock of the first beacon to identify a first transmission time when the first beacon transmitted the first timing signal;
using a time measured by a local clock of the second beacon to identify a first reception time when the second beacon received the first timing signal;
transmitting a second timing signal from the second beacon during a second time period;
determining whether signal transmission from the antenna of the first beacon is scheduled during the second time period;
after determining that signal transmission from the antenna of the first beacon is not scheduled during the second time period,
configuring the first beacon to route the second timing signal to an input of a linearization module of the first beacon during the second time period by configuring a switch of the first beacon to route the second timing signal from a signal gain or attenuation component of the first beacon, through the switch, and to a down-converter of the linearization module,
using the linearization module to create a digital representation of the second timing signal, and
using a baseband digital hardware module of the first beacon to identify one or more data items in the digital representation;

using another time measured by the local clock of the second beacon to identify a second transmission time when the second beacon transmitted the second timing signal;

using another time measured by the local clock of the first beacon to identify a second reception time when the first beacon received the second timing signal; and synchronizing the local clock of the first beacon with the local clock of the second beacon based on at least the first transmission time, the first reception time, the second transmission time, and the second reception time.

11. The one or more non-transitory processor-readable media of claim 10, wherein the synchronizing comprises: using a server to synchronize the local clock of the first beacon and the local clock of the second beacon based on the first transmission time, the first reception time, the second transmission time, and the second reception time.

12. The one or more non-transitory processor-readable media of claim 10, wherein the synchronizing comprises: using the first beacon or the second beacon to synchronize the local clock of the first beacon with the local clock of the second beacon based on the first transmission time, the first reception time, the second transmission time, and the second reception time.

13. The one or more non-transitory processor-readable media of claim 10, wherein the synchronizing comprises: using a third beacon to synchronize the local clock of the first beacon and the local clock of the second beacon based on the first transmission time, the first reception time, the second transmission time, and the second reception time.

14. The one or more non-transitory processor-readable media of claim 10, wherein the method comprises:
receiving, prior to transmitting the first timing signal from the first beacon, a network time at the first beacon; and
synchronizing, prior to transmitting the first timing signal from the first beacon, the local clock of the first beacon to the network time,
wherein the network time received at the first beacon is transmitted from a satellite network or a terrestrial network.

15. The one or more non-transitory processor-readable media of claim 10, wherein the method comprises:
receiving, prior to transmitting the second timing signal from the second beacon, a network time at the second beacon; and
synchronizing, prior to transmitting the second timing signal from the second beacon, the local clock of the second beacon to the network time,
wherein the network time received at the second beacon is transmitted from a satellite network or a terrestrial network.

16. The one or more non-transitory processor-readable media of claim 10, wherein the method comprises:
receiving, prior to transmitting the first timing signal from the first beacon, a network time at the first beacon; and
synchronizing, prior to transmitting the first timing signal from the first beacon, the local clock of the first beacon to the network time,
wherein the network time received at the first beacon is transmitted from a timing source having greater long-term accuracy than the local clock of the first beacon.

17. The one or more non-transitory processor-readable media of claim 10, wherein the method comprises:
receiving, prior to transmitting the second timing signal from the second beacon, a network time at the second beacon; and
synchronizing, prior to transmitting the second timing signal from the second beacon, the local clock of the second beacon to the network time,
wherein the network time received at the second beacon is transmitted from a timing source having greater long-term accuracy than the local clock of the second beacon.

18. The one or more non-transitory processor-readable media of claim 10, wherein after determining that signal transmission from the antenna of the first beacon is scheduled during the first time period, the method comprises:
generating the first timing signal at the first beacon; and
configuring the first beacon to route the first timing signal to the input of the linearization module during the first time period by configuring the switch of the first beacon to route the first timing signal from a coupler of the first beacon, through the switch, and to the down-converter of the linearization module.

* * * * *